United States Patent [19]
Saeda et al.

[11] Patent Number: 5,174,586
[45] Date of Patent: Dec. 29, 1992

[54] INCLINATION SETTING MECHANISM IN WORK ROTATING DEVICE FOR LASER BEAM MACHINE TOOL

[75] Inventors: Koichi Saeda, Higashiosaka; Shunji Sakura, Kyoto; Tatsuya Hirai, Itami, all of Japan

[73] Assignee: Tsubakimoto Chain Co., Osaka, Japan

[21] Appl. No.: 745,826

[22] Filed: Aug. 14, 1991

[30] Foreign Application Priority Data
Sep. 10, 1990 [JP] Japan .................................. 2-93992

[51] Int. Cl.⁵ .............................................. B23B 31/34
[52] U.S. Cl. ...................................... 279/5; 74/813 L; 409/221
[58] Field of Search ............... 279/5; 409/221, 222, 409/224, 61, 168, 165; 408/71, 35, DIG. 1; 74/813 L; 269/69, 57, 70, 73, 71; 248/667; 51/217 T, 217 A

[56] References Cited

U.S. PATENT DOCUMENTS

| | | | |
|---|---|---|---|
| 2,445,016 | 7/1948 | Bentley | 269/73 |
| 2,691,205 | 10/1954 | Bechler | 29/40 |
| 3,115,051 | 12/1963 | Burg | 408/35 |
| 4,502,457 | 3/1985 | Marron | 269/71 X |

Primary Examiner—Steven C. Bishop
Attorney, Agent, or Firm—Howson & Howson

[57] ABSTRACT

A work rotating device for use with a laser beam machine tool comprises an L-shaped frame from which a servo motor, speed reducer, and a rotatable work holder are supported in cantilever fashion by a shaft rotatable in bearings provided in a hole in the frame. The shaft has an end plate haivng a spring-loaded indexing pin engageable with any selected one of several indexing holes in an indexing plate fixed to the frame. The angle of inclination of the axis of rotation of the work is read from a scale on the end plate, by means of an indexing mark on the indexing plate. The indexing plate and end plate exert axial pressure respectively on outer and inner rings of the bearings to eliminate play.

5 Claims, 5 Drawing Sheets

INCLINATION SETTING MECHANISM IN WORK ROTATING DEVICE FOR LASER BEAM MACHINE TOOL

BRIEF SUMMARY OF THE INVENTION

This invention relates to work supporting devices for laser beam machine tools, and more particularly to a work supporting device incorporating a rotatable work holder having an improved mechanism for setting the angle of inclination of the workpiece.

Conventionally, most laser beam machine tools are designed with a laser head which moves relative to a fixed workpiece to machine the workpiece to the desired shape. Laser beam machine tools of this type have a number of disadvantages. One significant disadvantage is that the optical system allowing the laser head to move relative to the source of laser light is complicated and expensive, in that it requires multiple reflecting mirrors disposed in high-precision universal joints. Another significant disadvantage is that there is a large loss of energy in the path between the laser source and the laser head due to absorption and dispersion of laser light by the multiple mirrors required in the optical system. It is desirable, therefore to avoid these disadvantages, and one way in which this can be accomplished is to utilize a work holder which is designed to rotate the work relative to a fixed laser head.

There are, of course, many conventional machine tools having work holders which rotate relative to a fixed (or slowly adjusted) tool such as a cutting tool or a grinding tool. These rotating work holders require very solid supporting structures, e.g. twin-supporting structures, because they must have sufficient rigidity to endure the large external forces applied to the work during a machining operation. The rotating work holder itself is large in size and heavy (weighing generally about 100 kg. or more), and is hard to handle. The rotary work holder is typically designed so that its inclination can be adjusted by rotation of a crank or handle which operates a worm gear speed reduction mechanism having a large reduction ratio. The crank or handle must be rotated many times to achieve a change of just a few degrees in the inclination of the work holder. Accordingly, a large amount of time is taken up in adjusting the inclination of the work holder.

None of these machines designed for use with conventional cutting tools is well-suited for use with a laser machine tool.

The general object of this invention is to provide a work rotating device which is suitable for use with a laser beam machine tool and which overcomes the aforementioned problems. It is also an object of the invention to eliminate the need for rotating a crank or handle many times to achieve a change of a few degrees in the inclination of a work holder. Still further objects of the invention include the achievement of lightness in weight and easy, rapid operation in a work rotating device; the provision of a structurally simple and lightweight, yet strong, work holder support, which allows the inclination of the work to be adjusted, yet eliminates inaccuracies due to play; and the provision of a simple and easy-to-read inclination indicator.

The work rotating device in accordance with the invention comprises a frame, a rotatable work holding means for supporting a workpiece and rotating the workpiece about an axis, and means for tilting the axis of rotation of the work holding means to any selected one of a plurality of angles of inclination relative to the frame. The means for tilting the axis comprises a shaft connected at one end to the rotatable work holding means, bearing means for rotatably supporting the shaft in the frame to provide a cantilevered support for the work holding means, means providing a swing lever, connected to the shaft at the opposite end thereof, for effecting rotation of the shaft, means providing a plurality of angle indexing holes in fixed relationship to the frame, and an angle indexing pin provided at said opposite end of the shaft, the pin being engageable with any selected one of the angle indexing holes.

In the preferred embodiment of the work rotating device, the bearing means comprises an outer ring and an inner ring rotatable within, and relative to, the outer ring. The means providing a plurality of angle indexing holes in fixed relationship to the frame comprises an angle indexing plate mounted on the frame in fixed relationship thereto, with the angle indexing holes being formed in said plate. The plate presses axially on the outer ring of the bearing means. The angle indexing pin is preferably mounted on an end plate mounted on said opposite end of the shaft. The end plate is engaged with the inner ring of the bearing and presses axially on the inner ring of the bearing means in the same direction in which the angle indexing plate presses axially on the outer ring. One of the two plates is provided with an angle scale, and the other is provided with a mark, readable against the angle scale, so that the angle of inclination of the axis of rotation of the workpiece can be determined.

In the operation of the work rotating device, when the axis of rotation of the workpiece is to be tilted, the indexing pin is disengaged from one of the angle indexing holes, and the shaft is rotated by the swing lever to the desired angle of inclination. The angle indexing pin moves together with the shaft. When the work rotating device reaches the desired angle of inclination, the pin is brought into engagement with a selected angle indexing hole, and the work rotating device is fixed with the axis of rotation of the work situated at a predetermined angle of inclination.

Further details, objects and advantages of the invention will be apparent from the following detailed description, when read in conjunction with the drawings.

DETAILED DESCRIPTION

Figure 1:
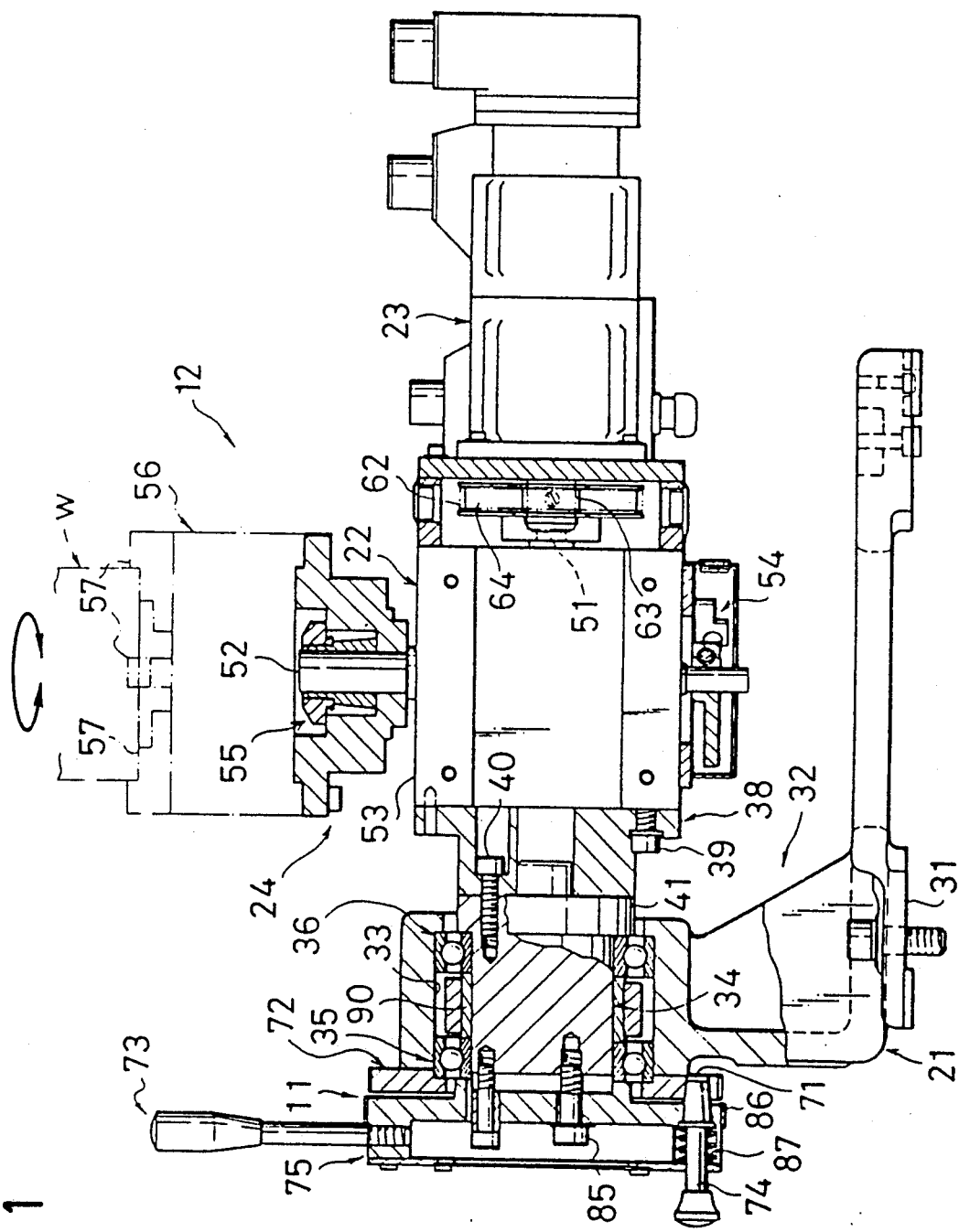
FIG. 1 is an elevational view, partly in section, showing a work rotating device in accordance with a preferred embodiment of the invention.
Figure 2:
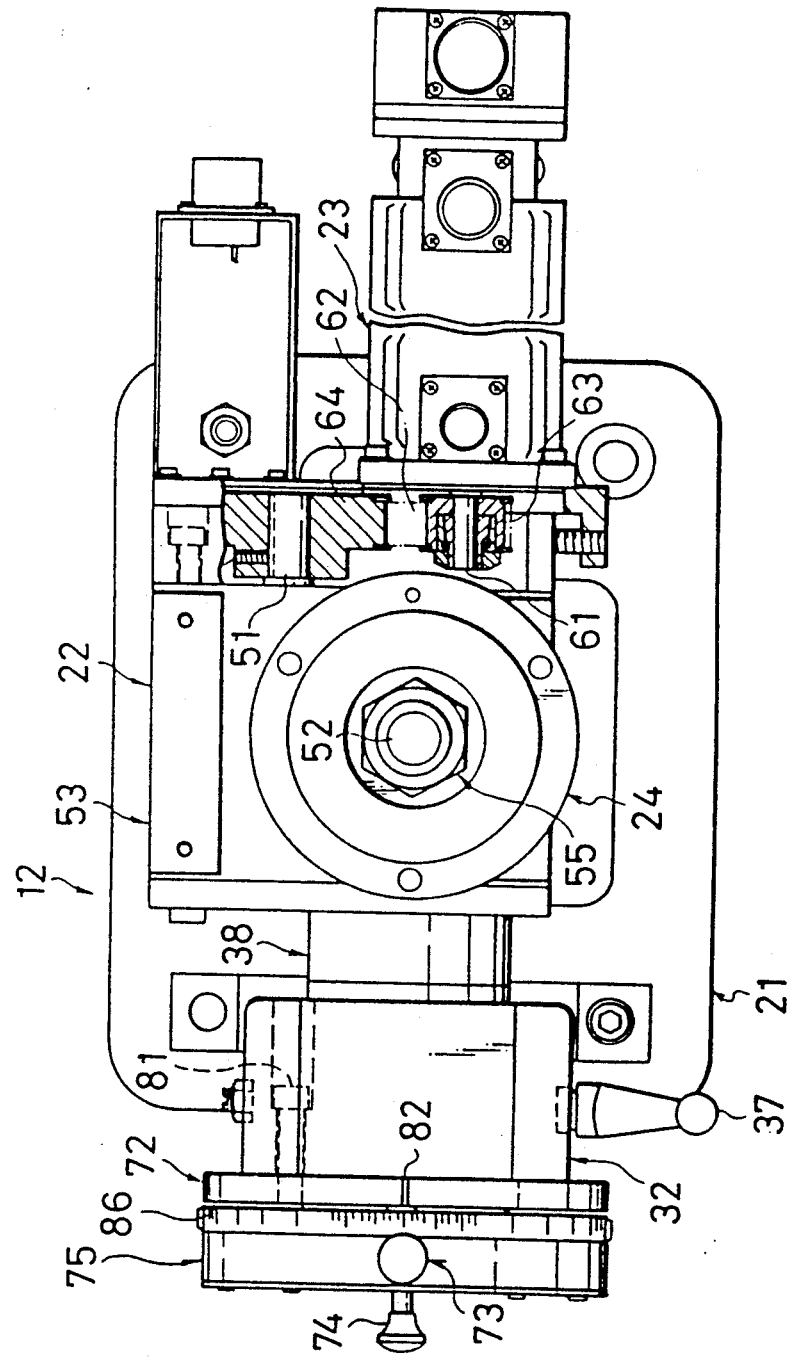
FIG. 2 is a top plan view of the device of FIG. 1.
Figure 3:
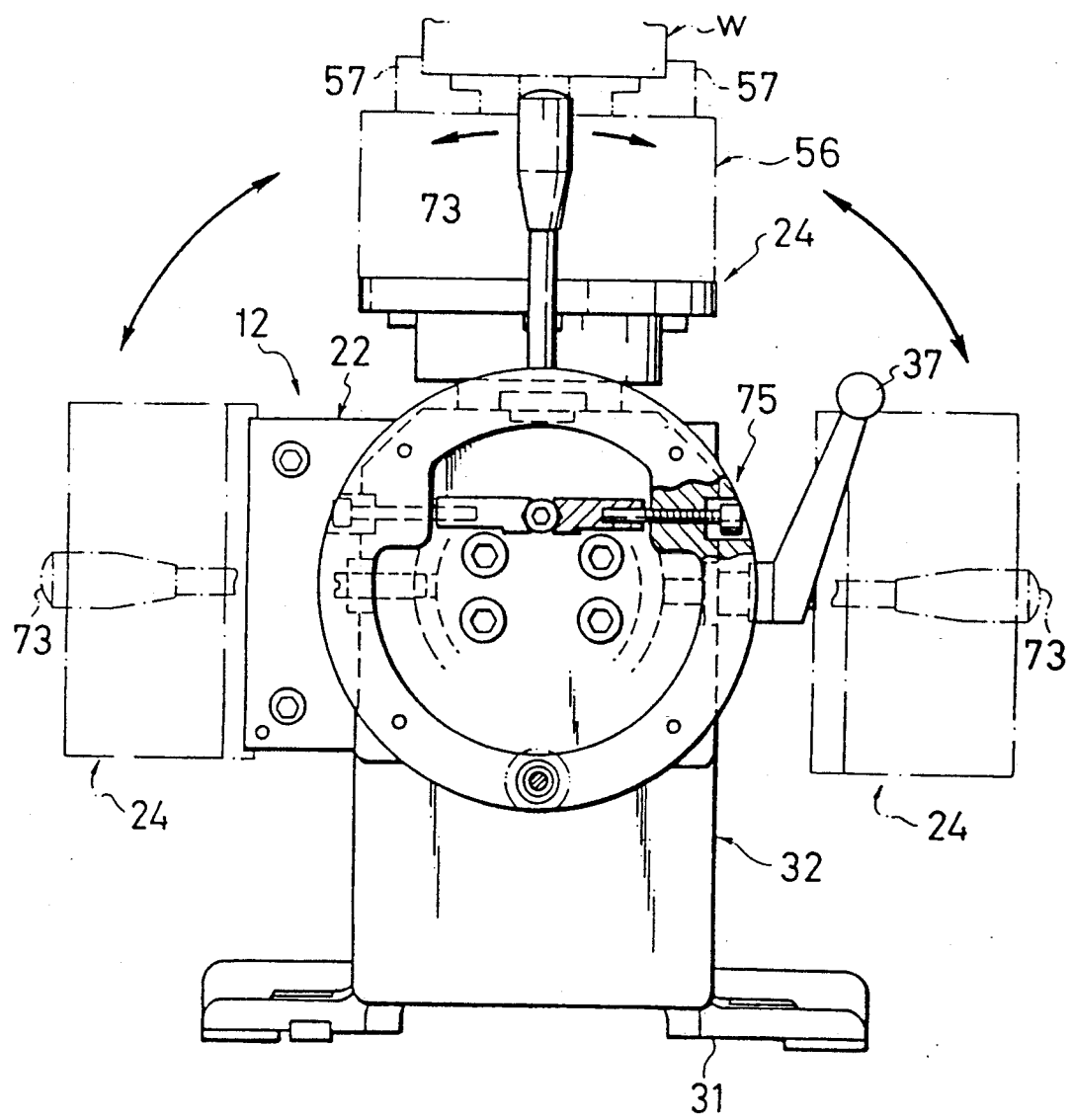
FIG. 3 is a left side elevation of the device as shown in FIG. 1, showing three possible positions of the work support.
Figure 4:
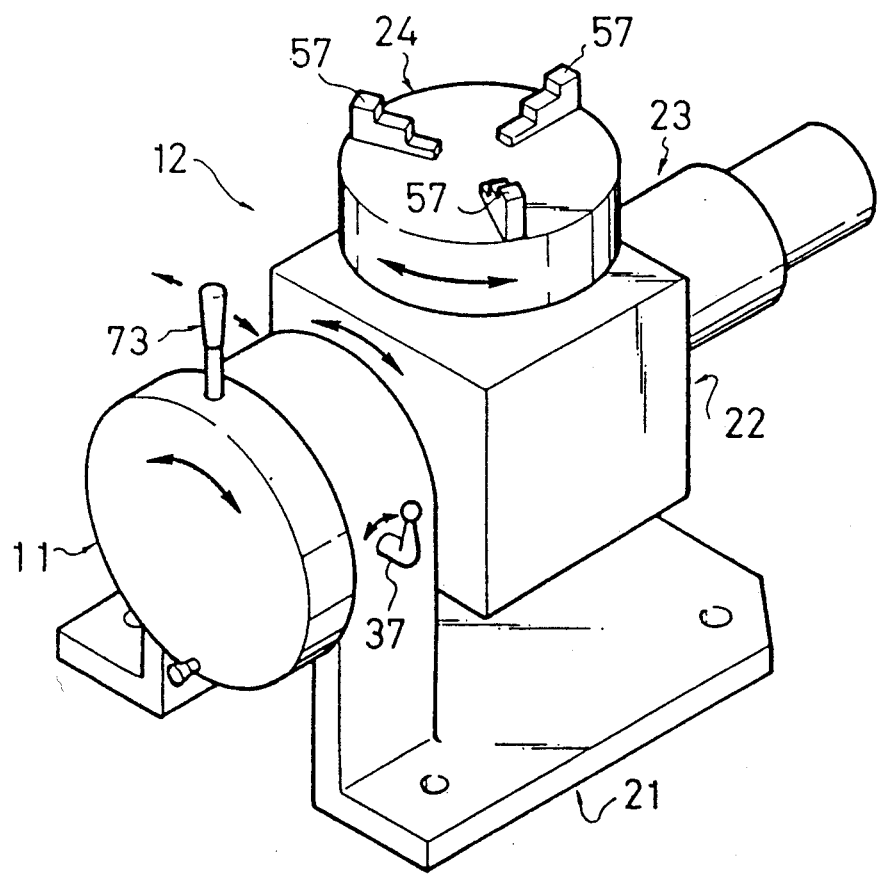
FIG. 4 is a schematic perspective view of the work rotating device.

The work rotating device of the invention is generally indicated by reference numeral 12 in FIGS. 1–4, and the angle setting mechanism of the work rotating device is generally indicated by reference numeral 11 in FIGS. 1 and 4.

The work rotating device is designed to be placed on the table (not shown) of a laser beam machine tool. The work rotating device includes a frame 21, a speed reducer 22, a servo motor 23, and a rotatable work support 24 driven through the speed reducer by the servo motor.

As shown in FIG. 1, frame 21 has a bottom surface 31 which is adapted to be engage the table of a laser beam machine tool. The frame has a generally L-shaped configuration when viewed from the perspective of FIG. 1. Upstanding portion 32 of the frame is provided with a hole 33, in which are situated a pair of ball bearings 35 and 36. A shaft 34 is supported in bearings 35 and 36 for rotation about a horizontal axis. A swingable locking lever 37 (FIGS. 2-4) is provided to operate a conventional locking mechanism (not shown) for locking shaft 34 against rotation relative to the frame.

Shaft 34 and speed reducer 22 are connected rigidly together through a bracket 38 by bolts, two of which are shown at 39 and 40. As will be apparent from FIG. 1, the assembly comprising speed reducer 22, motor 23 and work support 24 is supported in cantilever fashion from frame 21 by shaft 34.

The speed reducer has an input shaft 51 and an output shaft 52, rotatably supported in, and extending outward from, the speed reducer housing 53. The axes of shafts 51 and 52 are orthogonal to each other.

Input shaft 51 drives a work (not shown), and output shaft 52 is provided with a cam follower (not shown) having a plurality of radially needle rollers (not shown) which mesh with the worm so that the input and output shafts are in driving relationship. To eliminate backlash in the speed reducer, input shaft 51 is positioned with respect to output shaft 52 so that the axes of these two shafts are closer to each other than they would be for normal meshing. In this way, the needle rollers preload the worm, and the output shaft can rotate at a lower speed than that of the input shaft, but without backlash.

Output shaft 52 projects vertically both above the upper surface and below the lower surface of speed reducer housing 53. Between the lower end of shaft 52 and the lower surface of housing 53, there is provided an origin setting mechanism 54 for setting and adjusting an origin position for rotation of work support 24.

Work support 24 has a conventional chuck 56 having three stepped jaws 57 for grasping a workpiece W. The chuck is bolted to support 24, and support 24 is connected to the upwardly extending part of output shaft 52 of the speed reducer through a collet mechanism 55, which does not require a key or key slot.

Servo motor 23 is mounted on the right side surface of speed reducer housing 53 as shown in FIG. 1. As seen in FIG. 2, speed reducer input shaft 51 is connected, through a toothed belt 62 and toothed pulleys 63 and 64, to an output shaft 61 of servo motor 23. Although not specifically shown, Although not shown, the teeth of belt 62 and the teeth of toothed pulleys 63 and 64 have tooth profiles establishing a tight mesh between the teeth of the belt and the teeth of the pulleys so that backlash is almost completely eliminated. Furthermore, all of the parts assembled with shaft 34, i.e. speed reducer 22, work support 24, servo motor 23, etc. are designed and situated so that the center of gravity of the assembly is substantially aligned with the axis of rotation of shaft 34.

The operation of work rotating device 12 is as follows. With a workpiece W held by the jaws of chuck 56 on work-support 24, motor 23 is operated. The torque of motor 23 is transmitted through motor output shaft 61, pulley 63, toothed belt 62, and pulley 64, to input shaft 51 of speed reducer 22. Shaft 51 drives the worm and follower (not shown) within the speed reducer to cause rotation of output shaft 52. As a result, work support 24 is rotated about the axis of the output shaft 52. Thus, work support 24 is rotated in a horizontal plane when the axis of shaft 52 is vertical. In this operation, because of the speed reduction effected by speed reducer 22, work support 24 is rotated at a speed much lower than the speed of motor 23.

Figure 5:
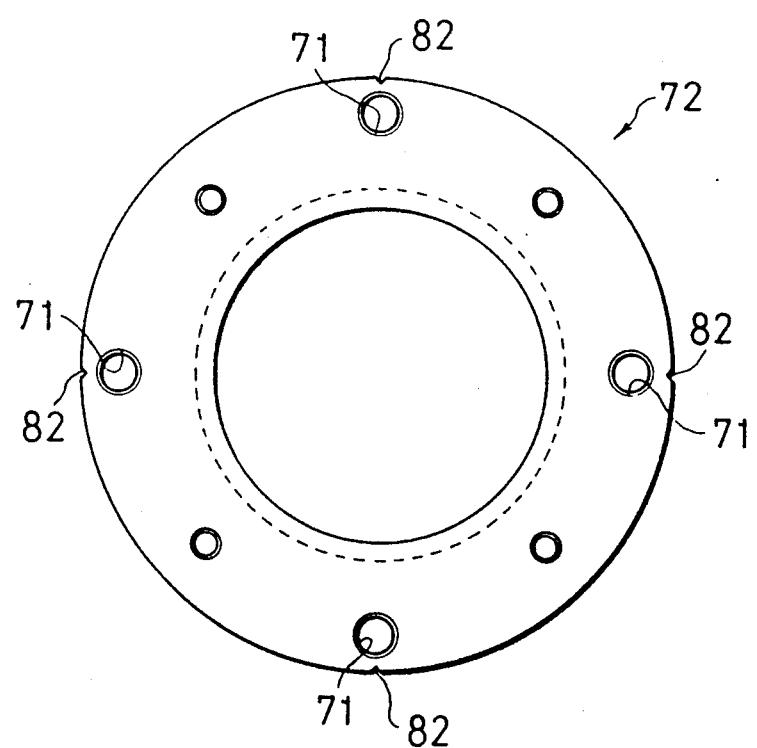
FIG. 5 is a left side elevational view of the angle indexing plate as shown in FIG. 1.

Angle setting mechanism 11 includes shaft 34, an angle indexing plate 72 having a plurality of angle indexing holes 71, as shown in FIG. 5, and an end plate 75 having a swing lever 73 and an angle indexing pin 74.

Angle indexing plate 72 is fixed by bolts 81 (FIG. 2) to the left side surface of upstanding portion 32 of frame 21. As shown in FIG. 5, angle indexing plate 72 has a ring-shaped configuration, and is provided with four indexing holes 71 at 90° intervals on an imaginary circle concentric with the central opening of the plate. The angle indexing plate is provided on its outer circumference with four notches 82, which are used in conjunction with an angle scale provided on end plate 75 to indicate the angle of inclination of the axis of rotation of the work. The four notches are located opposite to the four indexing holes 71, respectively.

End plate 75, which has a disc-shaped configuration, is fixed to the left end of shaft 34 by bolts 85, as shown in FIG. 1. Angle indexing pin 74 extends through end plate 75 in the axial direction. Swing lever 73 is secured to the outer circumference of end plate 75 and extends radially outward therefrom. An angle scale 86 (FIG. 2) is also provided on the outer circumference of the end plate.

Angle indexing pin 74 is selectively engageable with any one of angle indexing holes 71, and is normally biased toward plate 72 by spring 87. Preferably, pin 74 has a tapered end portion, and each angle indexing hole 71 is correspondingly tapered s that the tapered portion of the pin fits the indexing holes. Alternatively, pin 74 can have a straight (cylindrical) end portion, and each angle indexing hole 71 can be correspondingly straight.

The inner and outer rings of bearing 35 are urged respectively by end plate 75 and angle indexing plate 72 in the same axial direction, i.e. in the direction of thrust of shaft 34 toward the end to which bracket 38 is attached. An intermediate ring 90 is mounted on shaft 34 and interposed between bearings 35 and 36. Accordingly, the inner and outer rings of bearing 36 are urged, by bearing 35 through intermediate ring 90, against flange 41 on shaft 34 and an annular inside end surface of hole 33. With this bearing construction, play of the bearings in the thrust direction is substantially eliminated.

In the operation of the angle setting mechanism, when the work support 24 is in the condition shown in FIG. 4, the axis of speed reducer output shaft 52 is vertical and the work is rotated in a horizontal plane. The work rotates at a speed slower than that of motor 23 by virtue of the operation of speed reducer 22.

When the angle of inclination of the axis of rotation of the work is to be changed, lock lever 37 is swung to unlock shaft 34 so that it is rotatable. Then, angle indexing pin 74 is withdrawn from the hole 71 in which it is situated against the biasing force of spring 87, and lever 73 is manually swung to rotate shaft 34. As a result, speed reducer 22 and work support 24 are tilted together by rotation of shaft 34. When the work support is at the desired angle of inclination, indexing pin 74 is inserted into one of the other angle indexing holes 71 in plate 72. Finally, locking lever 37 is swung to its locking position to lock shaft 34 to frame 21. Using the angle indexing holes, the work support can be held to rotate about a vertical axis, or tilted 90° to either side of the vertical, as shown in FIG. 3.

If the work support 24 is to be inclined to angles intermediate the angles corresponding to indexing holes 71, the operator manually operates swing lever 73 to tilt work support 24 to the desired angle as indicated by one of notches 82 when read against angle scale 86. When the work support is at the desired inclination, lock lever 37 is operated to lock shaft 34 in fixed relationship to frame 21. Accordingly workpiece W can be tilted to any desired angle of inclination within a range of at least 180°.

Among the more important advantages of the work rotating device described above are the following.

First, because the work support is directly connected to manually operable swing lever 73, it can be tilted quickly and easily.

Second, by virtue of the engagement of pin 74 with indexing holes 71, the work support can be tilted to predetermined discrete positions quickly and easily in a single step.

Third, since shaft 34 provides cantilever support for the speed reducer, the motor and the rotating work support, the weight of the device as a whole is substantially less than that of conventional tiltable work rotating devices having twin supports.

Fourth, with the speed reducer, motor and rotating work holder supported in cantilever fashion, and with the ability of the work holder to be tilted quickly, the device is especially suited for use in conjunction with a laser beam machine tool, since almost no external force is applied to the work in a laser machining operation.

Fifth, by providing for axial pressure on the inner and outer rings of the bearings of the cantilevered shaft by the end plate and indexing plates respectively, play of the bearing during rotation of the shaft and end plate is substantially eliminated, and therefore the angle of inclination of the work can be set precisely.

Sixth, by virtue of the cooperation of the markings on the indexing plate with the scale on the end plate, the angle of inclination of the work can be read easily.

Numerous modifications can be made to the device specifically described herein. For example, the indexing holes 71 in plate 72 can be provided at positions other than at 90° intervals, and in greater numbers. More than one indexing pin can be provided in order to increase the number of predetermined inclination angles. The indexing scale can be provided on plate 72 and the markings against which the scale is read can be provided on end plate. Other modifications, which will occur to persons skilled in the art, can be made without departing from the scope of the invention as defined in the following claims.

We claim:

1. A work rotating device for a laser beam machine tool comprising a frame, rotatable work holding means for supporting a workpiece and rotating the workpiece about an axis, and means for tilting said axis to any selected one of a plurality of angles of inclination relative to the frame, wherein said means for tilting said axis comprises:
   a shaft connected at one end to said rotatable work holding means;
   bearing means for rotatably supporting said shaft in said frame, said bearing means comprising an outer ring mounted in said frame and an inner ring rotatable within, and relative to said outer ring, said shaft extending through said inner ring, whereby said bearing means provides a cantilevered support for said work holding means;
   shoulder means on said frame for preventing axial movement of said bearing means in one direction;
   means providing a swing lever having a manually graspable handle, said lever being connected to said shaft at the opposite end thereof, for effecting rotation of said shaft;
   means providing a plurality of angle indexing holes in fixed relationship to said frame; and
   an angle indexing pin provided at said opposite end of said shaft, said pin being engageable with any selected one of said angle indexing holes;
   in which said means providing a plurality of angle indexing holes in fixed relationship to said frame comprises an angle indexing plate mounted on said frame in fixed relationship thereto, said angle indexing holes being formed in said plate, and said plate pressing axially on said outer ring of the bearing means in said one direction, whereby said bearing is held in place against axial movement in both directions.

2. A work rotating device according to claim 1 further comprising means providing an end plate mounted on said opposite end of said shaft, said angle indexing pin being mounted on said end plate, and said end plate being engaged with said inner ring and pressing axially on said inner ring of the bearing means in the same direction in which said angle indexing plate presses axially on said outer ring.

3. A work rotating device according to claim 2 in which one of said plates is provided with an angle scale, and the other of said plates is provided with a mark, readable against said angle scale, whereby the angle of inclination of the axis of rotation of the workpiece can be determined, and in which said work holding means comprises a servo motor having an output shaft and a chuck mounted on said output shaft and said output shaft being normal to said shaft connected at one end to end rotatable work holding means.

4. A work rotating device for a laser beam machine tool comprising a frame, rotatable work holding means for supporting a workpiece and rotating and workpiece about an axis, and means for tilting said axis to any selected one of a plurality of angles of inclination relative to the frame, wherein said means for tilting said axis comprises:
   a shaft connected at one end to said rotatable work holding means;
   bearing means for rotatably supporting said shaft in said frame to provide a cantilevered support for said work holding means;
   means providing a swing lever, connected to said shaft at the opposite end thereof, for effecting rotation of said shaft;
   means providing a plurality of angle indexing holes in fixed relationship to said frame; and
   an angle indexing pin provided at said opposite end of said shaft, said pin being engageable with any selected one of said angle indexing holes; and
   in which:
   said bearing means comprises an outer ring and an inner ring rotatable within, and relative to, said outer ring;

said means providing a plurality of angle indexing holes in fixed relationship to said frame comprises an angle indexing plate mounted on said frame in fixed relationship thereto, said angle indexing holes being formed in said plate, and said plate pressing axially on said outer ring of the bearing means;

said work rotating device further comprises means providing an end plate mounted on said opposite end of said shaft;

said angle indexing pin is mounted on said end plate, and said end plate is engaged with said inner ring and presses axially on said inner ring of the bearing means in the same direction in which said angle indexing plate presses axially on said outer ring;

one of said plates is provided with an angle scale, and the other of said plates is provided with a mark, readable against said angle scale, whereby the angle of inclination of the axis of rotation of the workpiece can be determined; and said work holding means comprises a servo motor having an output shaft and a chuck mounted on said output shaft, said output shaft being normal to said shaft connected at one end to said rotatable work holding means.

5. A work rotating device for a laser beam machine tool comprising a frame, rotatable work holding means for supporting a workpiece and rotating the workpiece about an axis, and means for tilting said axis to any selected one of a plurality of angles of inclination relative to the frame, wherein said means for tilting said axis comprises:

a shaft connected at one end to said rotatable work holding means;

means providing a swing lever having a manually graspable handle, said lever being connected to said shaft at the opposite end thereof, for effecting rotation of said shaft;

bearing means for rotatably supporting said shaft in said frame, said bearing means comprising first and second bearings, both having inner and outer, relatively rotatable rings, said shaft extending through said inner rings, whereby said bearing means provides a cantilevered support for said work holding means;

spacer means holding said inner rings apart, whereby said first and second bearings are maintained in axially spaced relationship to each other;

shoulder means on said frame for engaging the outer ring of said first bearing and thereby preventing axial movement of said bearing means in one direction relative to the frame;

shoulder means on said shaft for engaging the inner ring of said first bearing and thereby preventing axial movement of said bearing means in said one direction relative to the shaft;

means providing a plurality of angle indexing holes in fixed relationship to said frame; and an angle indexing pin provided at said opposite end of said shaft, said pin being engageable with any selected one of said angle indexing holes;

in which said means providing a plurality of angle indexing holes in fixed relationship to said frame comprises an angle indexing plate mounted on said frame in fixed relationship thereto, said angle indexing holes being formed in said plate, and said plate pressing axially on said outer ring of said second bearing in said one direction; and said work rotating device further comprising an end plate fixed to said opposite end of said shaft, said angle indexing pin being slidably mounted in said end plate for selective engagement with said angle indexing holes, and said end plate pressing axially on said inner ring of said second bearing in said one direction.

* * * * *